United States Patent [19]

Bateman

[11] Patent Number: 5,013,907
[45] Date of Patent: May 7, 1991

[54] OPTICAL TIME DOMAIN TESTING INSTRUMENT

[75] Inventor: Glenn Bateman, Redmond, Oreg.

[73] Assignee: Tektronix, Inc., Beaverton, Oreg.

[21] Appl. No.: 500,156

[22] Filed: Mar. 27, 1990

[51] Int. Cl.⁵ .................................................. H01J 5/16
[52] U.S. Cl. ................................. 250/227.12; 356/73.1
[58] Field of Search ...................... 250/227.14, 227.12, 250/227.15, 227.16, 227.27, 227.21; 356/73.1; 330/4.3

[56] References Cited

U.S. PATENT DOCUMENTS

| | | | |
|---|---|---|---|
| 4,561,119 | 12/1985 | Epworth | 330/4.3 |
| 4,632,544 | 12/1986 | Form | 356/73.1 |
| 4,826,314 | 5/1989 | Comte | 356/73.1 |
| 4,859,015 | 8/1989 | Krinsky et al. | 250/227.27 |
| 4,899,043 | 2/1990 | Mochizuki et al. | 356/73.1 |
| 4,906,949 | 3/1990 | Pocholle et al. | 330/4.3 |
| 4,938,556 | 7/1990 | Digonnet et al. | 330/4.3 |

Primary Examiner—David C. Nelms
Assistant Examiner—K. Shami
Attorney, Agent, or Firm—John Smith-Hill; William K. Bucher

[57] ABSTRACT

An optical time domain testing instrument comprises a laser light source that is optically coupled to an optical fiber under test. The instrument further comprises a photodetector for receiving light from the fiber, and an optical amplifier optically coupled between the fiber and the photodetector.

10 Claims, 1 Drawing Sheet

OPTICAL TIME DOMAIN TESTING INSTRUMENT

BACKGROUND OF THE INVENTION

This invention relates to an optical time domain testing instrument.

A conventional optical time domain reflectometer (OTDR) comprises a laser diode that is periodically energized to launch optical interrogation pulses into a fiber under test. Return light received from the fiber under test is applied to a photodetector, such as an avalanche photodiode. The photodetector generates a current signal dependent on the intensity of light incident on the photodetector. The current signal is applied to an input amplifier and is converted to a voltage signal across the input impedance of the amplifier. The voltage signal is amplified by the amplifier and the resulting analog voltage signal is sampled at predetermined times relative to the time of energization of the laser diode. The sample values are processed and stored. The stored sample values can be used to provide a display showing intensity of return light received from the optical fiber as a function of distance from the laser diode.

In order to achieve high resolution, it is necessary that the interrogation pulses launched into the fiber under test be very short. Therefore, the input amplifier must have a very high bandwidth in order to preserve short rise time signal information in the current signal provided by the photodetector. This implies that the impedance across which the current signal is converted to voltage must be small, and therefore the amplitude of the resulting voltage signal is small. Consequently, increase in resolution of an OTDR is accompanied by a reduction in the signal-to-noise ratio of the instrument. The return light that is received from the fiber under test is a combination of Rayleigh backscattered light and fresnel reflection light. The intensity of the backscattered light is much less intense than the reflection light, and is generally of more interest than the backscattered light. The intensity of backscattered light is dependent upon the duration of the interrogation pulse, so that at high resolution the intensity of backscattered light is low and the signal-to-noise ratio is accordingly reduced.

When high intensity light is incident on the detector, for example due to fresnel reflection, detector recovery is not instantaneous and therefore the current provided by the detector immediately after receiving such high intensity illumination does not accurately represent the intensity of light incident on the detector at that time. A laser amplifier comprises a laser diode that is biased so that there is a population inversion in its channel, but the channel is not quite in a lasing condition. When light of the wavelength that would be emitted by the laser diode if it were biased into the lasing condition is introduced into the channel of the laser diode, it precipitates electron transitions such that the optical signal that enters the channel is amplified.

A fiber amplifier comprises an optical fiber doped with a selected impurity, such as erbium. If light of a first wavelength is introduced into the fiber, it causes a population inversion that can be triggered by light of a second wavelength, resulting in amplification of the light of the second wavelength.

SUMMARY OF THE INVENTION

In accordance with a first aspect of the invention, an optical time domain testing instrument comprises a laser light source, means for energizing the laser light source to emit a light pulse, and means for optically coupling the laser light source to an optical fiber under test. The instrument further comprises an optical amplifier and a photodetector, and means for optically coupling the optical amplifier to the fiber under test and optically coupling the optical amplifier to the photodetector.

In accordance with a second aspect of the invention, an optical time domain testing instrument comprises a laser light source, an optical amplifier, first optical coupling means for optically coupling the optical amplifier in series between the laser source and an optical fiber under test, means for energizing the laser light source to launch a light pulse into the fiber under test, a photodetector, and second optical coupling means for optically coupling the optical amplifier to the photodetector.

BRIEF DESCRIPTION OF THE DRAWINGS

For a better understanding of the invention, and to show how the same may be carried into effect, reference will now be made, by way of example, to the accompanying drawing in which.

DETAILED DESCRIPTION

Figure 1:
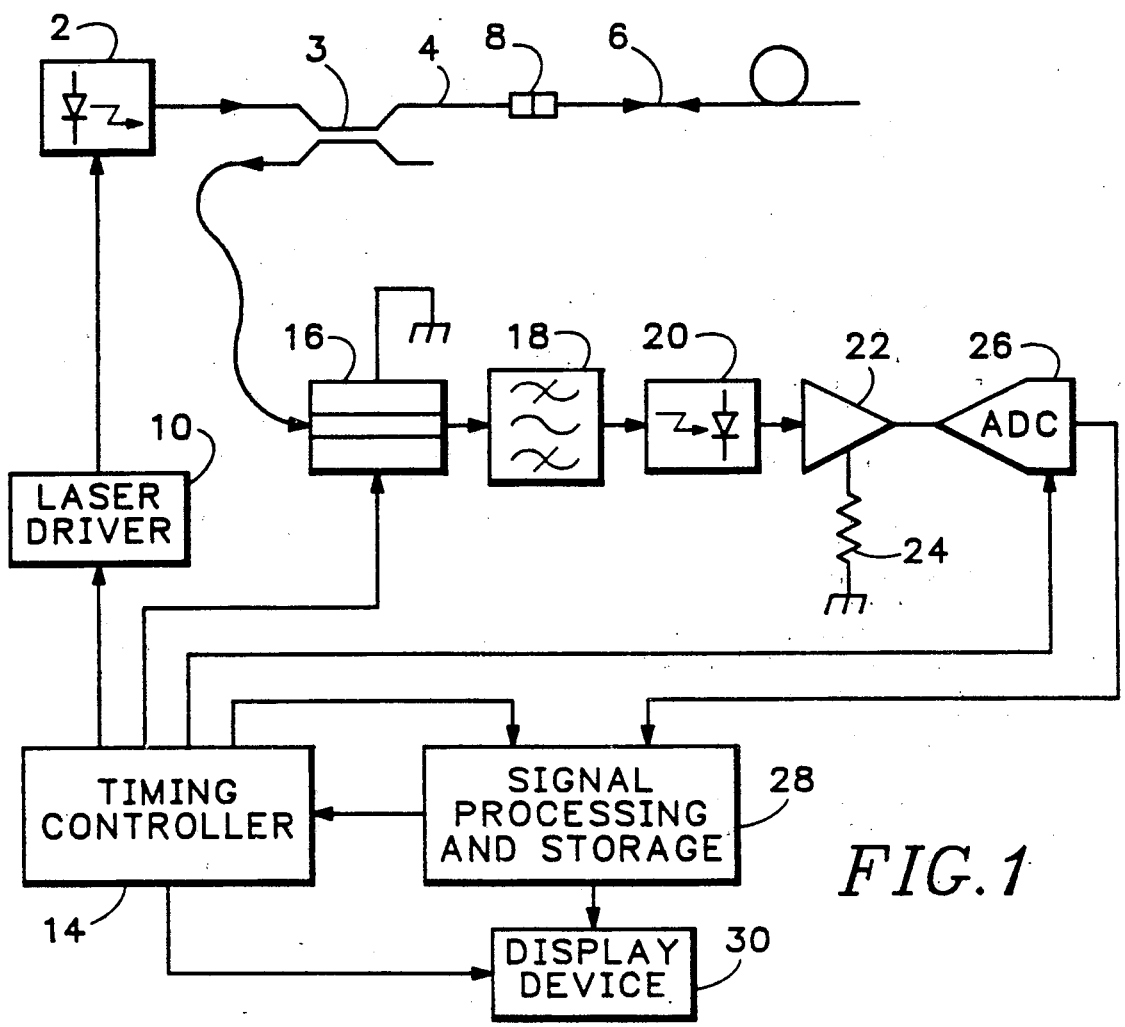
FIG. 1 is a simplified block diagram of a first optical time domain reflectometer embodying the present invention.

The optical time domain reflectometer (OTDR) shown in FIG. 1 comprises a laser diode 2, which is connected through one waveguide of a directional coupler 3 to a launch fiber 4. Fiber 4 can be connected to a fiber under test 6 using a fiber optic connector 8. When the OTDR is operating in the acquisition mode, laser diode 2 is intermittently energized by a laser driver 10, which operates in response to signals received from a timing controller, and emits interrogation pulses into fiber 6.

The OTDR further comprises a semiconductor laser amplifier 16 and an optical bandpass filter 18 optically coupled in series between a second waveguide of directional coupler 3 and a photodetector 20. A portion of the return light received from fiber 6 is transferred to the second waveguide and is applied to amplifier 16. The gain of the laser amplifier is controlled in dependence on a bias current provided by timing controller 14. Detector 20 is connected to an amplifier 22, which has an input impedance element 24. The current signal provided by detector 20 is converted to voltage across impedance element 24, and the resulting voltage signal is amplified by amplifier 22. The voltage output signal of amplifier 22 is applied to an analog-to-digital converter (ADC) 26, which samples and digitizes the voltage signal in response to signals provided by timing controller 14. A signal processing and storage circuit 28 receives the sample values provided by ADC 26 and related time values provided by timing controller 14 and processes the sample values and stores them at memory locations whose addresses depend on the respective time values. In a display cycle, the sample values are read out and are applied to a display device 30 with the related time values for providing a display representing intensity of return light received from fiber 6 as a function of time relative to launch of an interrogation pulse into fiber 6.

When the bias current provided to laser amplifier 16 is sufficient to place the laser amplifier on the brink of laser operation, laser amplifier 16 serves as a high bandwidth optical preamplifier for the photodetector. Therefore, the current provided by the photodetector in response to a given intensity of light received from fiber 6 is much higher than it would be if detector 20 were driven directly by the return light from fiber 6. Moreover, if the OTDR is operated in a training mode before operating in the acquisition mode, the bias current provided to the laser amplifier 16 in the acquisition mode can be controlled as a function of time so as to attenuate high level return light received from fiber 6 due to fresnel reflection and minimize distortion due to finite detector recovery time.

The optical bandpass filter reduces the optical bandwidth of the noise incident on the photodetector.

Figure 2:
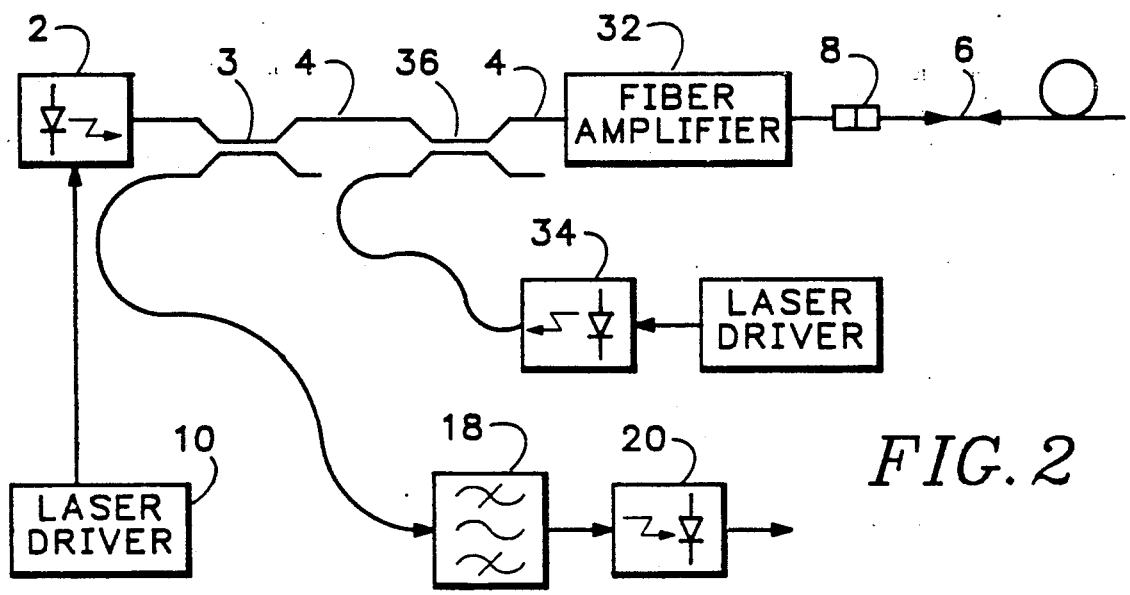
FIG. 2 is a simplified block diagram of a second optical time domain reflectometer embodying the present invention.

FIG. 2 illustrates a modification of the OTDR shown in FIG. 1. In the case of FIG. 2, a fiber amplifier 32 is connected between directional coupler 3 and connector 8. Fiber amplifier 32 is continuously pumped by the light pulses from a laser diode 34 that is coupled to fiber 4 by a directional coupler 36 and emits lights at a wavelength such that the fiber amplifier amplifies light at the wavelength emitted by laser diode 2. The wavelength of light emitted by laser diode 34 is outside the passband of filter 18, so that light that is emitted by laser diode 34 and is backscattered or reflected toward filter 18 does not illuminate detector 20. Fiber amplifier 32 amplifies both the interrogation pulses and the backscattered and reflected light returned in response to the interrogation pulses.

It will be appreciated that the invention is not restricted to the particular embodiment that has been described, and that variations may be made therein without departing from the scope of the invention as defined in the appended claims and equivalents thereof. For example, use of a fiber amplifier is not limited to the embodiment shown in FIG. 2 and may be applied to the arrangement shown in FIG. 1 also. Further, when a fiber amplifier is connected in the path of the interrogation pulses, as shown in FIG. 2, it is not essential that the fiber amplifier be pumped from the end at which the interrogation pulses enter the fiber amplifier, since the fiber amplifier may be pumped from either end or both ends.

I claim:

1. An optical time domain testing instrument comprising:
   a laser light source,
   means for optically coupling the laser light source to an optical fiber under test,
   means for energizing the laser light source to launch a light pulse into the fiber under test,
   an optical amplifier,
   means for optically coupling the optical amplifier to the fiber under test,
   a photodetector,
   means for optically coupling the optical amplifier to the photodetector, and
   means for selectively adjusting the gain of the optical amplifier as a function of the time following launch of a light pulse.

2. An instrument according to claim 1, wherein the means for optically coupling the laser light source to the optical fiber under test comprise a first optical waveguide, and the means for optically coupling the optical amplifier to the fiber under test comprise a second optical waveguide, the first and second optical waveguides being respective waveguides of a directional coupler.

3. An instrument according to claim 1, further comprising an optical bandpass filter coupled between the optical amplifier and the photodetector.

4. An instrument according to claim 1, wherein the optical amplifier is a semiconductor laser amplifier.

5. An instrument according to claim 1, wherein the optical amplifier is a fiber amplifier.

6. An optical time domain testing instrument comprising:
   a laser light source,
   an optical amplifier,
   first optical coupling means for optically coupling the optical amplifier in series between the laser light source and an optical fiber under test,
   means for energizing the laser light source to launch a light pulse into the fiber under test,
   a photodetector, and
   second optical coupling means for optically coupling the optical amplifier to the photodetector.

7. An instrument according to claim 6, wherein the first optical coupling means comprise a first optical waveguide coupled between the laser light source and the optical amplifier, and the second optical coupling means comprise a second optical waveguide, the first and second optical waveguides being respective waveguides of a directional coupler.

8. An instrument according to claim 7, further comprising an optical bandpass filter coupled between the optical amplifier and the photodetector.

9. An instrument according to claim 7, wherein the optical amplifier is a fiber amplifier.

10. An instrument according to claim 6 comprising means for selectively adjusting the gain of the optical amplifier as a function of the time following launch of a light pulse.

* * * * *